(12) United States Patent
Tang et al.

(10) Patent No.: US 9,650,280 B2
(45) Date of Patent: May 16, 2017

(54) VACUUM PUMPING DEVICE, VACUUM GLAZING MANUFACTURING SYSTEM, AND RELATED METHOD

(71) Applicant: Beijing Synergy Vacuum Glazing Technology Co., Ltd, Beijing (CN)

(72) Inventors: Jianzheng Tang, Beijing (CN); Liguo Wang, Beijing (CN)

(73) Assignee: Beijing Synergy Vacuum Glazing Technology Co., Ltd, Beijing (CN)

( * ) Notice: Subject to any disclaimer, the term of this patent is extended or adjusted under 35 U.S.C. 154(b) by 64 days.

(21) Appl. No.: 14/381,707

(22) PCT Filed: Jul. 19, 2013

(86) PCT No.: PCT/CN2013/079719
§ 371 (c)(1),
(2) Date: Aug. 28, 2014

(87) PCT Pub. No.: WO2014/023154
PCT Pub. Date: Feb. 13, 2014

(65) Prior Publication Data
US 2015/0047394 A1 Feb. 19, 2015

(30) Foreign Application Priority Data
Aug. 10, 2012 (CN) .......................... 2012 1 0291474

(51) Int. Cl.
*C03B 23/24* (2006.01)
*E06B 3/677* (2006.01)
(Continued)

(52) U.S. Cl.
CPC .......... *C03B 23/245* (2013.01); *E06B 3/6612* (2013.01); *E06B 3/6775* (2013.01); *E06B 3/66304* (2013.01); *Y02B 80/24* (2013.01)

(58) Field of Classification Search
CPC ..... G02F 1/1303; Y02B 80/24; E06B 3/6612; E06B 3/66304; E06B 3/677; E06B 3/6775
See application file for complete search history.

(56) References Cited

U.S. PATENT DOCUMENTS 2,755,521 A * 7/1956 Lippman, Jr. ............. A47F 3/12
156/109
5,005,557 A * 4/1991 Bachli ..................... C03C 17/09
126/572
(Continued)

FOREIGN PATENT DOCUMENTS

| CN | 1286670 A | 3/2001 |
|---|---|---|
| CN | 201071341 Y | 6/2008 |

(Continued)

OTHER PUBLICATIONS

English Language machine translation of JP 11-247539 accessed Dec. 21, 2015 at PAJ.*
(Continued)

*Primary Examiner* — Jason L Lazorcik
(74) *Attorney, Agent, or Firm* — The Webb Law Firm

(57) ABSTRACT

Provided is a vacuum pumping device and a related method for manufacturing a vacuum glazing. The vacuum pumping device includes: a circular tubular pumping operation unit; a cylindrical pump-out hole sealing operation unit; a control part; and a driving device. The pumping operation unit and the pump-out hole sealing operation unit share a central axis, and form a cylinder with the former being outside and the latter being inside. A pumping channel is formed in a tube wall of the pumping operation unit, and a heating unit is disposed in the top portion inside the pump-out hole sealing operation unit. The control part time-sequentially controls the pumping operation unit and the pump-out hole sealing operation unit to move, controls the pumping channel to perform operations, and controls the heating unit to heat a sealing sheet to perform a pump-out hole sealing operation.

8 Claims, 11 Drawing Sheets

(51) Int. Cl.
*E06B 3/66* (2006.01)
*E06B 3/663* (2006.01)

(56) References Cited

U.S. PATENT DOCUMENTS

| | | | |
|---|---|---|---|
| 6,506,272 B1* | 1/2003 | Aggas | E06B 3/6612 |
| | | | 156/109 |
| 8,304,046 B2 | 11/2012 | Zhao | |
| 2002/0121111 A1* | 9/2002 | Yoshizawa | B32B 17/10972 |
| | | | 65/34 |
| 2012/0285199 A1* | 11/2012 | Li | B23K 1/0008 |
| | | | 65/34 |

FOREIGN PATENT DOCUMENTS

| | | | |
|---|---|---|---|
| CN | 101234847 A | | 8/2008 |
| CN | 101348326 A | | 1/2009 |
| CN | 201473455 U | | 5/2010 |
| CN | 102030464 A | | 4/2011 |
| JP | 11240739 A | * | 9/1999 |
| JP | 11247539 A | | 9/1999 |
| JP | 2003300757 A | | 10/2003 |
| KR | 1020120009788 A | | 2/2012 |

OTHER PUBLICATIONS

Machine translation of JP 11-240739 accessed at PAJ Mar. 12, 2016.*
English Lanugate translation of JP 11-240739.*

* cited by examiner

VACUUM PUMPING DEVICE, VACUUM GLAZING MANUFACTURING SYSTEM, AND RELATED METHOD

CROSS-REFERENCE TO RELATED APPLICATIONS

This application is the U.S. national phase of International Application No. PCT/CN2013/079719 filed Jul. 19, 2013, and claims priority to Chinese Patent Application No. 201210291474.7 filed Aug. 10, 2012, the disclosures of which are hereby incorporated in their entirety by reference.

FIELD OF THE INVENTION

The present invention relates to a vacuum glazing manufacturing system, and particularly, to a vacuum pumping device used in a continuous automatic production line of vacuum glazing, a vacuum glazing manufacturing system using the same and a related method.

BACKGROUND OF THE INVENTION

As shown in FIG. 1, an example of a basic structure of vacuum glazing is illustrated. Specifically, a gap with a height of h is formed between an upper glass sheet 5 and a lower glass sheet 4 through pillars 3 arranged therebetween. A glass solder 1, the upper glass sheet 5 and the lower glass sheet 4 together form a cavity layer 2 (i.e. a vacuum layer to be achieved) after sealing the edges of the upper glass sheet 5 and the lower glass sheet 4 by using the glass solder 1. After pumping out the air inside the cavity layer 2 via a pump-out hole 41, the vacuum layer is formed. Then, a sealing sheet 53 is used to seal the pump-out hole 41 (for example, through combining the sealing sheet 53 and the lower glass sheet 4 into a whole by means of sintering or fusing a sealing solder 51). As a preferred but not restrictive example, a Low-E film 8 may be attached onto the inner side of at least one of the upper glass sheet 5 and the lower glass sheet 4 (for example, the lower glass sheet 4), and an encapsulated getter 40 may also be placed in the pump-out hole 41.

In addition to the above described structural features, it mainly depends on the completeness of the edge sealing, complete vacuum pumping, and reliable sealing of the pump-out hole to achieve physical vacuum properties of the vacuum glazing. Accordingly, a number of techniques have been developed and used in the manufacturing systems/production lines for manufacturing vacuum glazing. For example, CN 101234847A: Continuous vacuum glazing edge sealing furnace CN 1286670A: Method and device for manufacturing vacuum glazing CN 201071341Y: Continuous fusion-sealing and vacuum-pumping glazing processing apparatus CN 101348326A: Continuous production method and apparatus of vacuum glazing CN 102030464A: Continuous production apparatus of vacuum glazing KR 10-2012-0009788: Vacuum glazing, a manufacturing method and a system thereof The disclosures of all the literatures described above will be incorporated herein by reference in their entirety, serving as the existing background art, prior to the present application, of vacuum glazing pumping and sealing by using a continuous/discontinuous vacuum furnace in a vacuum glazing manufacturing system.

Although the above described literatures have disclosed some beneficial teachings, in actual practice, there are still various technical problems to be solved. For example, it is difficult for a continuous vacuum furnace to achieve rapid and uniform heating and cooling in a vacuum environment. Since devices of respective portions in a manufacturing system are associated with each other, a breakdown in a certain portion may lead to the failure of the entire production line, and its maintenance is complicated. As a result, the manufacturing system is of relatively poor overall coordination and low stability, thereby increasing the cost of the product. In addition, it has to take both the pumping and sealing apparatus and the structure of the pump-out hole of the vacuum glazing into account during a design stage, thereby resulting in relatively complicated process and even incapable of achieving a real "continuous" production.

Specifically, the above background literatures CN 101348326A, CN 102030464A and KR 10-2012-0009788 are taken as examples, in which the processes of pre-pumping, edge sealing, vacuum pumping and pump-out hole sealing are performed in different processing stages from the processing stages relating to achieving vacuum properties. Since different environmental temperatures are required in these different processing stages, it has to wait a considerable long time to perform a heating or a cooling process in transiting from one processing stage to another one. Further, because the pumping device, the vacuum pumping device and the hole sealing device used in different processing stages are operated alternately, corresponding processes, which are technically difficult and time-consuming, are needed to align the corresponding devices with the pump-out hole, respectively. Thus, with regard to the so-called "continuous" processing in the above described background art, it is a desire difficult to be achieved no matter in time and/or in space.

More specifically, according to the existing techniques (for example, see FIG. 4 and the corresponding paragraph [0035] of the specification of the patent literature CN 102030454A serving as the background of the present invention), the chamber of the processing furnace, in which the entire volume of the glazing is accommodated, needs to be heated during the edge sealing processing stage of the vacuum glazing. The process of pre-pumping, vacuum pumping and hole sealing, however, are only related to the pump-out hole and its adjacent areas, thus, the overall heating/cooling operation performed on the entire volume of the glazing being processed and the vacuum pumping operation performed on the entire chamber of the processing furnace accommodating the entire volume of the glazing are a waste of time and energy sources.

SUMMARY OF THE INVENTION

The present invention is aimed to overcome the above defects in the existing techniques, and provides a vacuum pumping device used in a continuous automatic production line of vacuum glazing, a vacuum manufacturing system using the same and a related method.

Specifically, in order to achieve the above object, according to an aspect of the present invention, it provides a vacuum pumping device integrated with both a pumping operation function and a pump-out hole sealing function, the vacuum pumping device includes: a circular tubular pumping operation unit; a cylindrical pump-out hole sealing operation unit; a control part; and a driving device. Herein, the pumping operation unit and the pump-out hole sealing operation unit have a same central axis along which both of the units can be moved relatively, and form a cylinder with the former being outside and the latter being inside. A pumping channel is formed in a tube wall of the pumping operation unit to be connected to an inner surface of the tube wall, and a heating unit is disposed in the top portion inside the pump-out hole sealing operation unit. The control part, through the driving device, time-sequentially controls the pumping operation unit and the pump-out hole sealing operation unit to move relatively along the central axis, controls the pumping channel to perform a pre-pumping/pre-pressing operation or a vacuum pumping operation, and controls the heating unit to heat a sealing sheet to perform a pump-out hole sealing operation.

According to the vacuum pumping device of the above described embodiment of the present invention, when performing the pre-pumping/pre-pressing operation or the vacuum pumping operation, the pumping operation unit is moved along the central axis such that it is positioned on a lower surface of the vacuum glazing being processed and is aligned with the centre of a pump-out hole, thereby causing a cavity formed by relative movement of the pumping operation unit and the pump-out hole sealing operation unit to be connected to a cavity layer of the vacuum glazing being processed via the pump-out hole, and the pumping channel of the pumping operation unit to be connected to the cavity. The pre-pumping/pre-pressing operation or the vacuum pumping operation is performed through the pumping channel of the pumping operation unit. Further, when performing the pump-out hole sealing operation after completing the vacuum pumping operation, the pump-out hole sealing operation unit is moved along the central axis such that a sealing sheet with a sealing solder is placed on the pump-out hole. The heating unit is controlled so as to heat the sealing sheet to fuse the sealing solder, thereby sealing the pump-out hole.

According to the vacuum pumping device of another embodiment of the present invention, in order to achieve soft contact between the pumping operation unit and the vacuum glazing being processed and to increase air-tight effect, an elastic heat-resisting seal ring may be provided on the top end of the pumping operation unit. In addition, in order to decrease the operating temperature of the pumping operation unit and to prevent the seal ring from aging rapidly, a cooling system may be formed in the tube wall of the pumping operation unit.

According to the vacuum pumping device of another embodiment of the present invention, the driving device may includes: a lift driving device for driving the pumping operation unit and the pump-out hole sealing operation unit to move relatively along the central axis; a pre-pressing/vacuum pumping driving device for controlling the pumping channel of the pumping operation unit to perform the pre-pumping/pre-pressing operation or the vacuum pumping operation; a heating driving device for controlling the heating unit to heat the sealing sheet; and a cooling driving device for driving cooling liquid (for example, water) to flow circularly in the cooling system.

According to the vacuum pumping device of another embodiment of the present invention, the pumping operation unit may include pre-pumping/pre-pressing operation unit and vacuum pumping operation unit. The pre-pumping/pre-pressing operation unit and the vacuum pumping operation unit may have the same central axis as the pump-out hole sealing operation unit, and form a cylinder with the former being outside and the latter being inside, and pumping channels may be formed in respective tube walls of both units to perform the pre-pumping/pre-pressing operation and the vacuum pumping operation.

According to the vacuum pumping device of the above embodiments of the present invention, when performing the pre-pumping/pre-pressing operation, the pre-pumping/pre-pressing operation unit is moved along the central axis such that it is positioned on the lower surface of the vacuum glazing being processed and is aligned with the centre of the pump-out hole, thereby causing a cavity formed by relative movement of the pre-pumping/pre-pressing operation unit and the pump-out hole sealing operation unit to be connected to the cavity layer of the vacuum glazing being processed via the pump-out hole, and the pumping channel of the pre-pumping/pre-pressing operation unit to be connected to the cavity. The pre-pumping/pre-pressing operation is performed through the pumping channel of the pre-pumping/pre-pressing operation unit. When the vacuum pumping operation is performed, the vacuum pumping operation unit is moved along the central axis such that it is positioned on the lower surface of the vacuum glazing being processed and is aligned with the centre of the pump-out hole, thereby causing a cavity formed by relative movement of the vacuum pumping operation unit and the pump-out hole sealing operation unit to be connected to the cavity layer of the vacuum glazing being processed via the pump-out hole, and the pumping channel of the vacuum pumping operation unit to be connected to the cavity. The vacuum pumping operation is performed through the pumping channel of the vacuum pumping operation unit. Further, when the pump-out hole sealing operation is performed after completing the vacuum pumping operation, the pump-out hole sealing operation unit is moved along the central axis such that the sealing sheet with a sealing solder is placed on the pump-out hole. The heating unit is controlled so as to heat the sealing sheet to fuse the sealing solder, thereby sealing the pump-out hole.

According to the vacuum pumping device of another embodiment of the present invention, an elastic heat-resisting seal ring may be provided on the top end of the pumping operation unit. Accordingly, the seal ring contacts with the vacuum glazing being processed only when performing the vacuum pumping operation, thereby increasing the lifetime of the seal ring. In addition, in order to decrease the operating temperature of the vacuum pumping operation unit and to prevent the seal ring from aging rapidly, a cooling system may be formed in the tube wall of the vacuum pumping operation unit.

According to the vacuum pumping device of another embodiment of the present invention, the driving device may includes: a lift driving device for driving the pre-pumping/pre-pressing operation unit, the vacuum pumping operation unit and the pump-out hole sealing operation unit to move relatively along the central axis; a pre-pumping/vacuum pumping driving device for controlling the pumping channels of the pre-pumping/pre-pressing pumping operation unit and the vacuum pumping operation unit to perform the pre-pumping/pre-pressing pumping operation and the vacuum pumping operation, respectively; a heating driving device for controlling the heating unit to heat the sealing sheet; and a cooling driving for driving cooling liquid (for example, water) to flow circularly in the cooling system.

According to another aspect of the present invention, a vacuum glazing manufacturing system is provided, which uses the vacuum pumping device according to the present invention, and performs the pre-pumping/pre-pressing operation, the vacuum pumping operation and the pump-out hole sealing operation in manufacturing a vacuum glazing according to the method provided by the present invention.

Using the vacuum pumping device provided by the present invention in a continuous automatic production line of vacuum glazing enables the pre-pumping/pre-pressing operation, the vacuum pumping operation and the pump-out hole sealing operation to be completed in integration, such that continuous and reliable operation steps are truly realized, and it is easy to coordinate and operate respective portion of the manufacturing system, thereby increasing the stability of the vacuum glazing manufacturing system. According to the vacuum pumping device, the vacuum glazing manufacturing system using the same and the related method of the present invention, a vacuum glazing with higher precision can be produced while the consumptions of energy sources and time may be decreased, and real continuous production can be achieved.

BRIEF DESCRIPTION OF THE DRAWINGS

FIG. 2b is the top view of the vacuum pumping device shown in FIG. 2a;

FIG. 5 illustrates a schematic view of an operating status when performing pre-pumping/pre-pressing operation or vacuum pumping operation by the vacuum pumping device shown in FIG. 2a;

FIG. 7a illustrates a schematic view of an improved structure of the pumping device shown in FIG. 2a;

FIG. 7b is the top view of the vacuum pumping device shown in FIG. 7a;

DETAILED DESCRIPTION OF THE EMBODIMENTS

Figure 1:
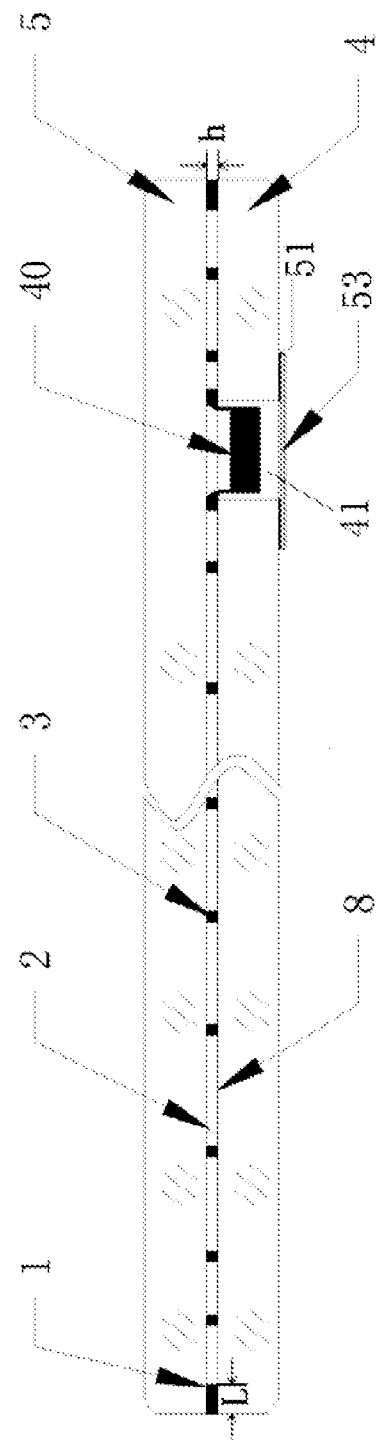
FIG. 1 illustrates a schematic view of a structure of a vacuum glazing.

Hereinafter, the embodiments of the present invention will be described in details in conjunction with the accompanying drawings, in which like reference numerals refer to like elements.

Figure 2A:
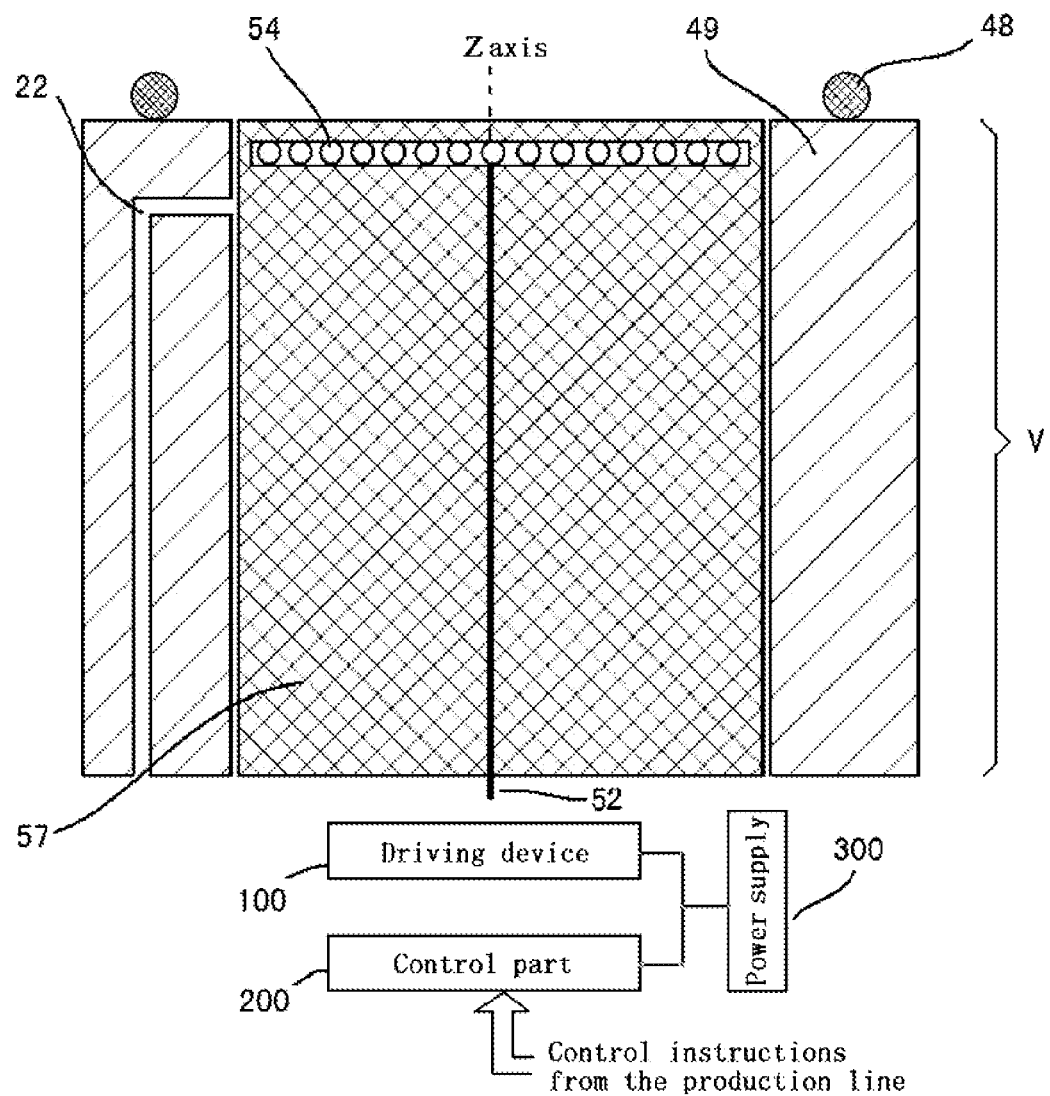
FIG. 2a illustrates a cross-sectional view of a vacuum pumping device, which reflects the basic structural principle of the vacuum pumping device, according to the present invention.
Figure 2B:
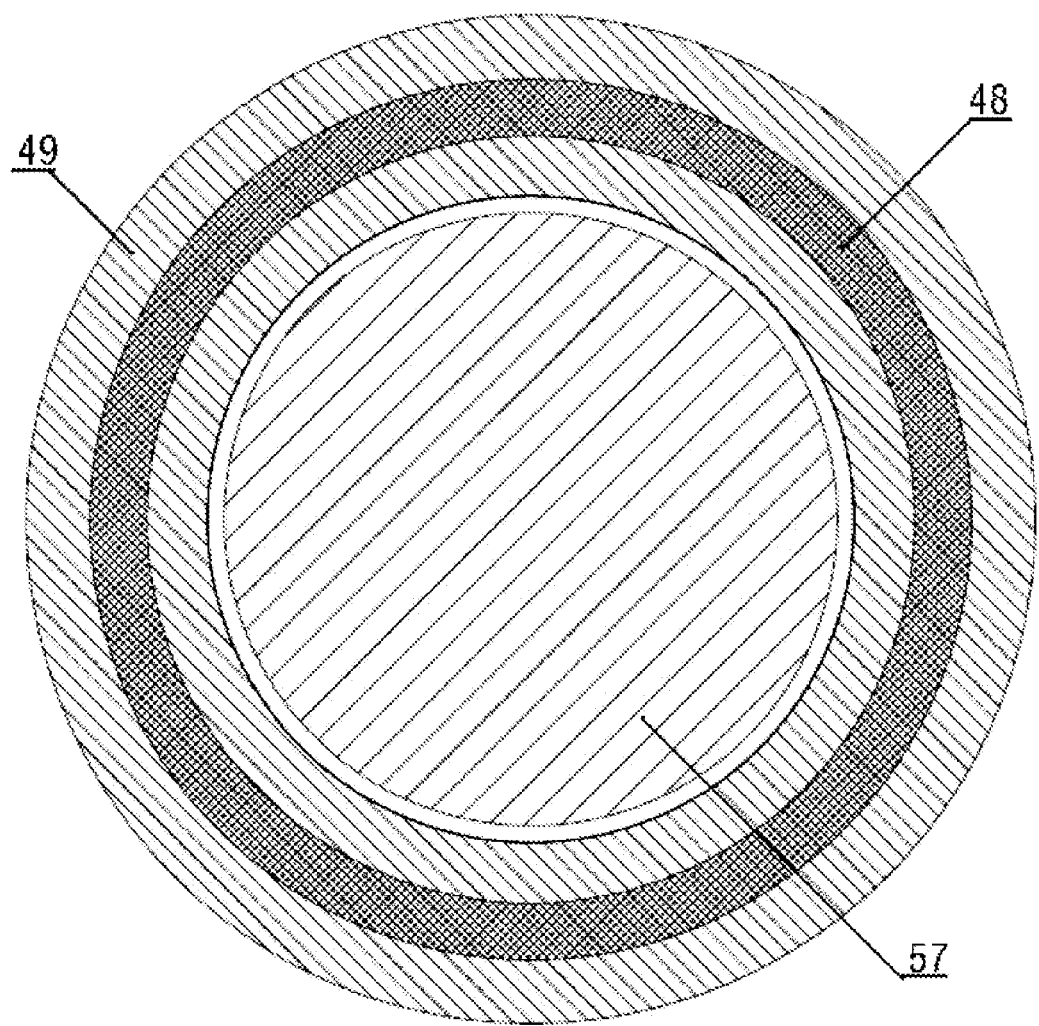

FIG. 2a illustrates a cross-sectional view of a vacuum pumping device according to the present invention, and it reflects the basic structural principle of the vacuum pumping device according to the present invention. FIG. 2b is the top view of the vacuum pumping device shown in FIG. 2a.

Referring to FIGS. 2a and 2b, the vacuum pumping device according to the present invention may include a mechanical part V, a driving device 100 and a control part 200. It should be understood that operations of the vacuum pumping of the present invention are controlled by instructions sent from the control system of the whole production line, and therefore, it can be operated concertedly with respective processing furnaces and conveyors of the entire vacuum glazing manufacturing system.

As shown in FIGS. 2a and 2b, the mechanical part V may include a circular tubular pumping operation unit 49 and a cylindrical pump-out hole sealing operation unit 57. Herein, the pumping operation unit 49 and the pump-out hole sealing operation unit 57 share a same central axis Z, and form a cylinder (i.e. the mechanical part V) together. Both of the pumping operation unit 49 and the pump-out hole sealing operation unit 57 may move relatively along the central axis Z, thereby being pressed on a pump-out hole 41 of the vacuum glazing being processed (as shown in FIG. 1, for example), respectively, so as to align with the centre of the pump-out hole 41 and cover the pump-out hole 41 completely.

A pumping channel 22, through which the air in a cavity layer 2 of the vacuum glazing is pumped into the atmosphere by an extraction pump (not shown in the FIGS.) during a procedure of performing pre-pumping/pre-pressing operation or vacuum pumping operation, is formed in the tube wall of the pumping operation unit 49 to be connected to the inner surface of the tube wall. A heating unit 54 (for example, a resistance heating wire) is provided in the top portion inside the pump-out hole sealing operation unit 57. When power is supplied through a power line 52, the heating unit 54 can cause the temperature of the pump-out hole sealing operation unit 57, especially its top portion, to be increased rapidly.

The driving device 100 obtains instructions from the control part 200 and operates according to the obtained instructions. The driving device 100 mainly provides two functions as follows:

mechanically moving the pumping operation unit 49 and the pump-out hole sealing operation unit 57, such that the pumping operation unit 49 and the pump-out hole sealing operation unit 57 are moved relatively along the central axis Z, thereby being pressed on the pump-out hole 41 of the vacuum glazing being processed, respectively, so as to align with the centre of the pump-out hole 41 and cover the pump-out hole 41 completely; and performing the pre-pumping/pre-pressing operation or vacuum pumping operation through the pumping channel 22.

In order to achieve a flexible contact between the pumping operation unit 49 and the vacuum glazing being processed and to increase air-tight effect, an elastic heat-resisting seal ring, such as a seal ring 48, may be provided on the top end of the pumping operation unit 49.

Figure 3:
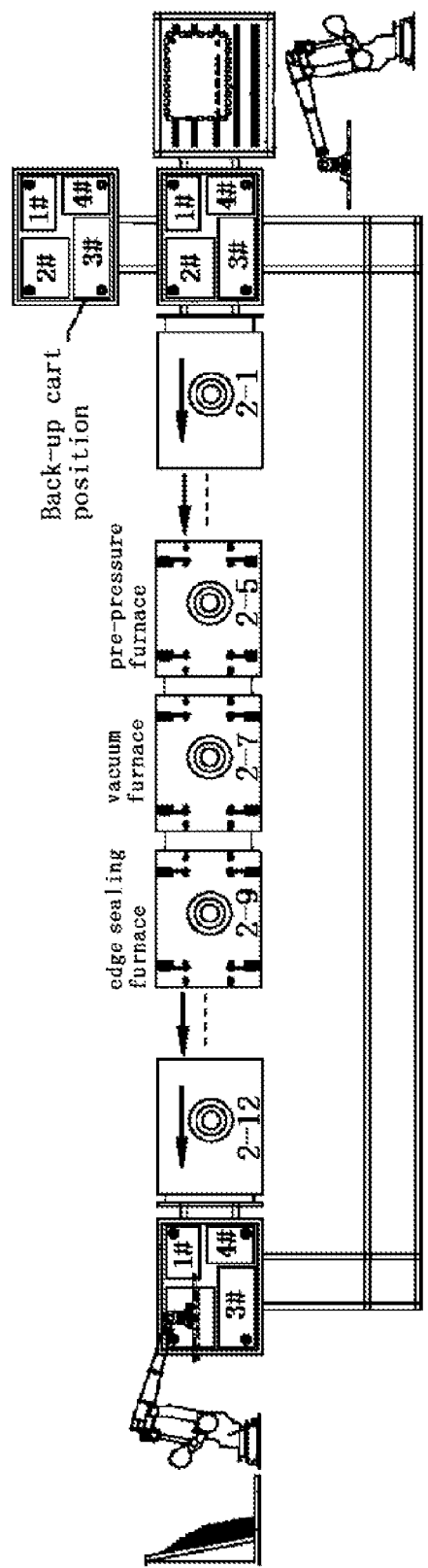
FIG. 3 illustrates an operational position of the vacuum pumping device according to the present invention in a vacuum glazing manufacturing system/production line.

FIG. 3 shows an operational position of the vacuum pumping device according to the present invention in a vacuum glazing manufacturing system/production line.

Referring to FIG. 3, in the vacuum glazing manufacturing system according to the present invention, the whole production line may be divided roughly into 12 processing stages, i.e., from (2-1) to (2-12) of FIG. 3. For the purpose of clarity, only the pre-pumping/pre-pressing operation (2-5), the vacuum pumping operation (2-7) and the pump-out hole sealing operation (2-9) are shown in the figure, while those stages that are not directly related to the present invention are not shown.

Figure 4:
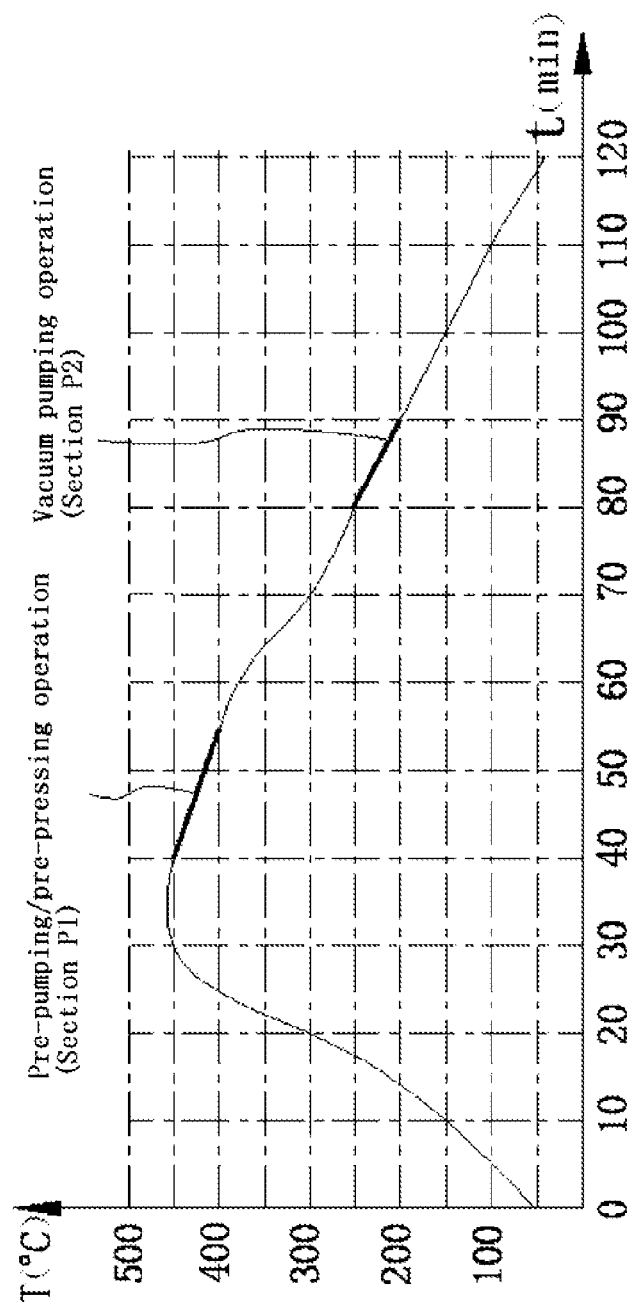
FIG. 4 illustrates a temperature-time curve of performing pre-pumping/pre-pressing operation and vacuum pumping operation.
Figure 9:
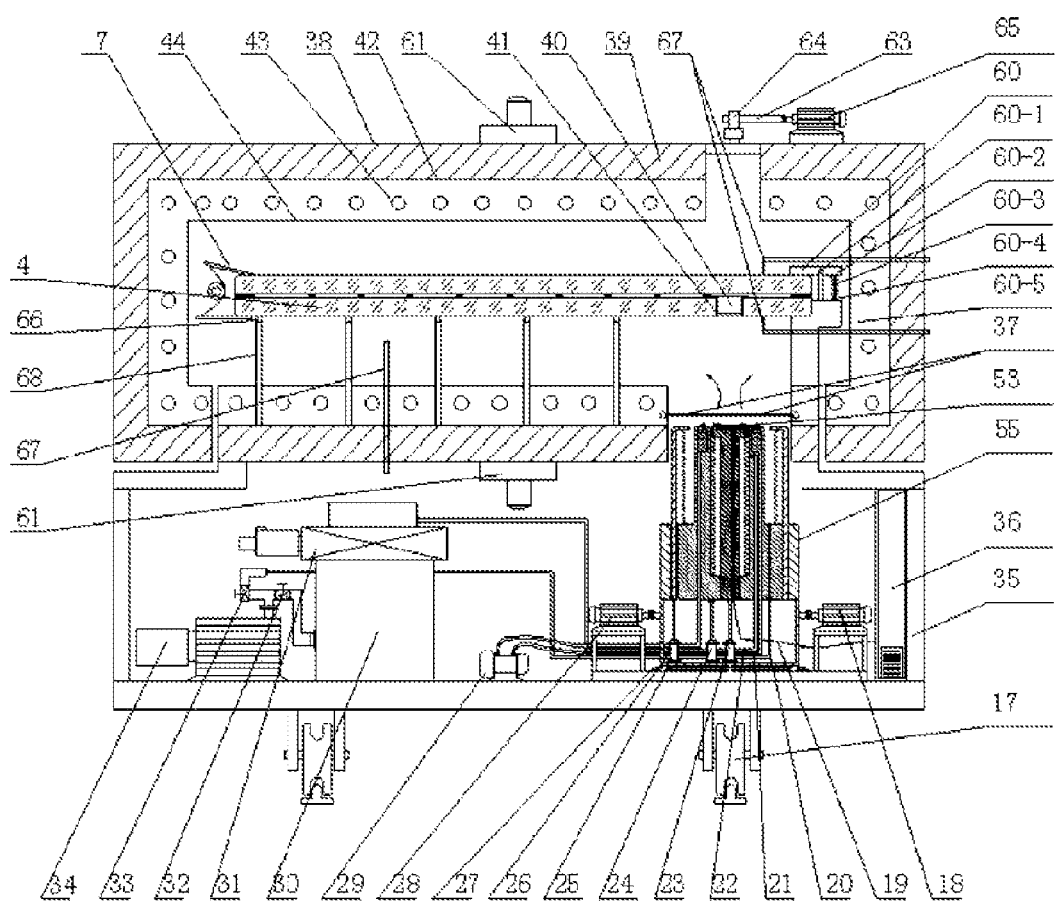
FIG. 9 is a schematic view illustrating that the vacuum pumping device shown in FIG. 8 is mounted in a vacuum glazing manufacturing system/production line.

Two "pumping" operations with different purposes need to be performed at two stages among these processing stages. As shown in FIG. 3, the first "pumping" operation is the pre-pumping/pre-pressing operation (2-5) performed in a pre-pressing furnace. When a glass solder 1 on the periphery of the vacuum glazing, as shown in FIG. 1, is cooled to a certain temperature (400° C., for example) after being fused at a high temperature, a vacuum pump 34 (as shown in FIG. 9) is enabled to perform the pre-pumping/pre-pressing operation. When a pressure difference of about one atmospheric pressure (equivalent to a pressure of 10 tons per square meter) exists between the cavity layer 2 of the vacuum glazing and the outside, the glazing solder 1 is flatten out. After being solidified, the glazing solder 1 has the same height h as the pillars 3 of the vacuum glazing, as shown in FIG. 1, thereby preventing from forming a destructive tensile stress at the edge portion of the vacuum glazing, so as to ensure the quality of the product and prolong its lifetime. It can be seen that the purpose of performing the pre-pumping/pre-pressing operation (2-5) in the pre-pressing furnace shown in FIG. 3 is to achieve the completeness of the edge sealing, and a certain temperature and duration of pumping are required to perform the pre-pumping/pre-pressing operation (2-5). The section P1 of the curve shown in FIG. 4 shows that the temperature range of the pre-pumping/pre-pressing operation is approximately from 400° C. to 450° C. and the duration of pumping is about 15 minutes, in the above described preferred example. Those skilled in the art, however, should understand that the aforementioned temperature/duration may be different, depending on various types of the glazing solders 1 and the powers of the pumping devices, but most importantly, the shown pre-pumping/pre-pressing operation is used for ensuring the completeness of the edge sealing.

As shown in FIG. 3, the second "pumping" operation is the vacuum pumping operation (2-7) performed in the vacuum furnace, and the vacuum pump 34 needs to be enabled again at this point. The section P2 of the curve shown in FIG. 4 shows that a temperature range of the vacuum pumping operation is approximately from 200° C. to 250° C. and a duration of pumping is about 10 minutes, in the above described preferred example.

Below, by referring to FIGS. 3 to 6, the operating processes of the pre-pumping/pre-pressing operation (2-5), the vacuum pumping operation (2-7) and the pump-out hole sealing operation (2-9), which are implemented by the vacuum pumping device of the present invention, as shown in FIG. 2a, will be described in details.

Figure 5:
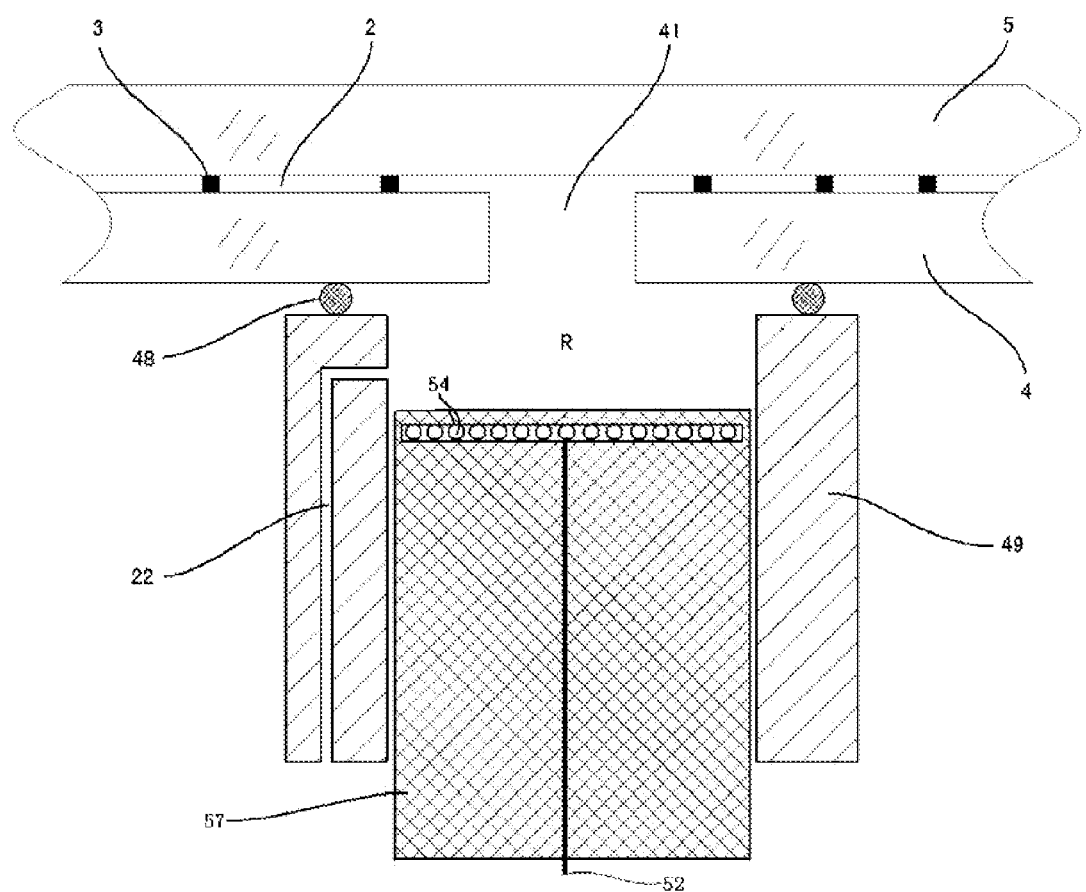

The pre-pumping/pre-pressing operation (2-5) is performed in the pre-pressing furnace shown in FIG. 3. The driving device 100 moves the pumping operation unit 49 toward the vacuum glazing being processed along the central axis Z, so as to press the pumping operation unit 49 on the lower glass sheet 4 and cover the pump-out hole 41, as shown in FIG. 5. A seal ring 48 may be provided on the top of the pumping operation unit 49. The seal ring 48 not only ensures an elastic compaction between the lower glass sheet 4 and the pumping operation unit 49, but also achieves an airtight contact therebetween. As shown in FIG. 5, since the backend supporting the pumping device according to the present invention is with air tightness in the entire mechanical structure, an airtight cavity R connecting both the cavity layer 2 of the vacuum glazing and the pumping channel 22 via the pump-out hole 41 is formed. Then, the vacuum pump 34 connecting the pumping channel 22 is enabled to pump, so as to pump out most of the air in the air-tight cavity R. For example, under the conditions of the temperature ranging from 400° C. to 450° C., the duration of pumping is about 15 minutes (i.e., the section P1 shown in FIG. 4), such that the pressure difference of about one atmospheric pressure exists between the cavity layer 2 of the vacuum glazing and the outside, so as to even out the glass solder 1 used for edge sealing. After being solidified, the glass solder 1 has the same height h as the pillars 3 of the vacuum glazing, thereby preventing from forming a destructive tensile stress at the edge portion of the vacuum glazing, so as to ensure the quality of the product and prolong its lifetime.

Next, the vacuum pumping device according to the present invention and the vacuum glazing being processed get into the vacuum furnace shown in FIG. 3 to perform vacuum pumping operation (2-7). At this point, the vacuum pump 34 is enabled again, and in a case where the temperature ranges approximately from 200° C. to 250° C., the vacuum pumping operation lasting about 10 minutes is performed (that is, the section P2 shown in FIG. 4), to achieve high-vacuum status in the cavity layer 2 of the vacuum glazing.

For the purpose of intuition and clarity, an encapsulated getter 40 (shown in FIGS. 1, 6 and 9), which may actually exist, is not shown in FIG. 5. The requirements about the encapsulated getter 40 may refer to the detailed description in the prior application CN 201473455U belonging to the same applicant, the disclosure of which is incorporated herein by reference in its entirety.

Also, for the purpose of intuition and clarity, the sealing sheet 53 (shown in FIG. 6) is not shown in FIG. 5. Those skilled in the art, after being taught by the present application, however, should understand that the vacuum pumping device based on the present invention always maintains a fixed positional relationship with the vacuum glazing being processed, thereby really achieving continuous production. Those skilled in the art, based on such knowledge, should understand that the sealing sheet 53 has been already arranged on the pump-out hole sealing operation unit 57 before fixing the vacuum pumping device according to the present invention to the vacuum glazing being processed, and then, when performing the pump-out hole sealing operation (27), the sealing sheet 53 is placed on the pump-out hole 51 as the pump-out hole sealing operation unit 57 moves along the central axis Z.

Figure 6:
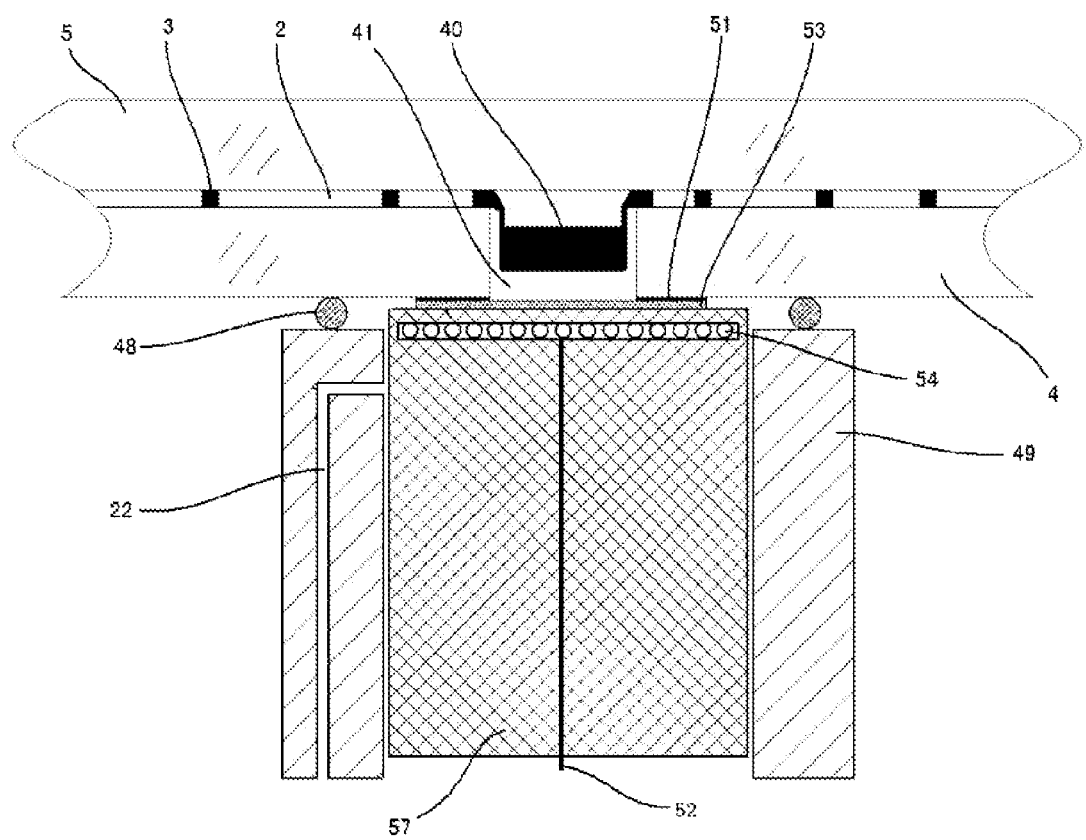
FIG. 6 illustrates a schematic view of an operating status when performing pump-out hole sealing operation by the vacuum pumping device shown in FIG. 2a after completing vacuum pumping operation.

FIG. 6 illustrates a schematic view of an operating status of performing pump-out hole sealing operation (2-9) by the vacuum pumping device shown in FIG. 2a after vacuum pumping operation has been completed. The sealing operation (2-9) is performed in a sealing furnace of FIG. 3. The driving signal of the control part 200 enables the driving device 100 to move the pump-out hole sealing operation unit 57 along the central axis Z in order to place the sealing sheet with the sealing solder 51 on the pump-out hole 41, and to press the pump-out hole sealing operation unit 57 onto the sealing sheet 53 elastically. After that, the driving device 100 supplies power to the heating unit 54 through the power line 52, such that the temperature at the top portion of the pump-out hole sealing operation unit 57 is increased rapidly, so as to fuse the sealing solder 51 between the sealing sheet 53 and the lower glass sheet 4 of the vacuum glazing. The heating is then stopped, such that the fused sealing solder 51 is solidified and the pump-out hole 41 is sealed with the sealing sheet 53.

In the aforementioned description by referring to the accompanying drawings, in the process from the pre-pressure furnace to the sealing furnace via the vacuum furnace in the production line shown in FIG. 3, the vacuum pumping device according to the present invention always maintains a fixed positional relationship with the vacuum glazing being processed, therefore, it is not necessary to repeatedly perform alignments on a processing head such as a pre-pressing head, a vacuum pumping head and a sealing head, as in the prior art, which makes the operation simple and continuous, really achieving continuous production.

Figure 7A:
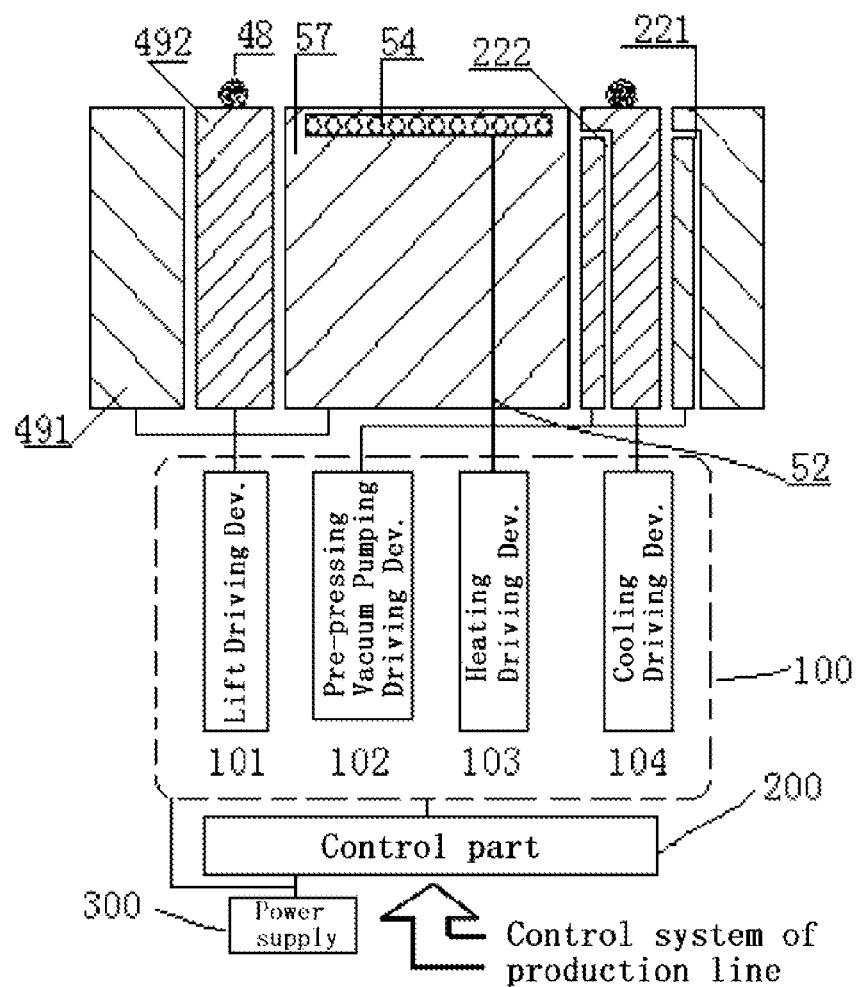
Figure 7B:
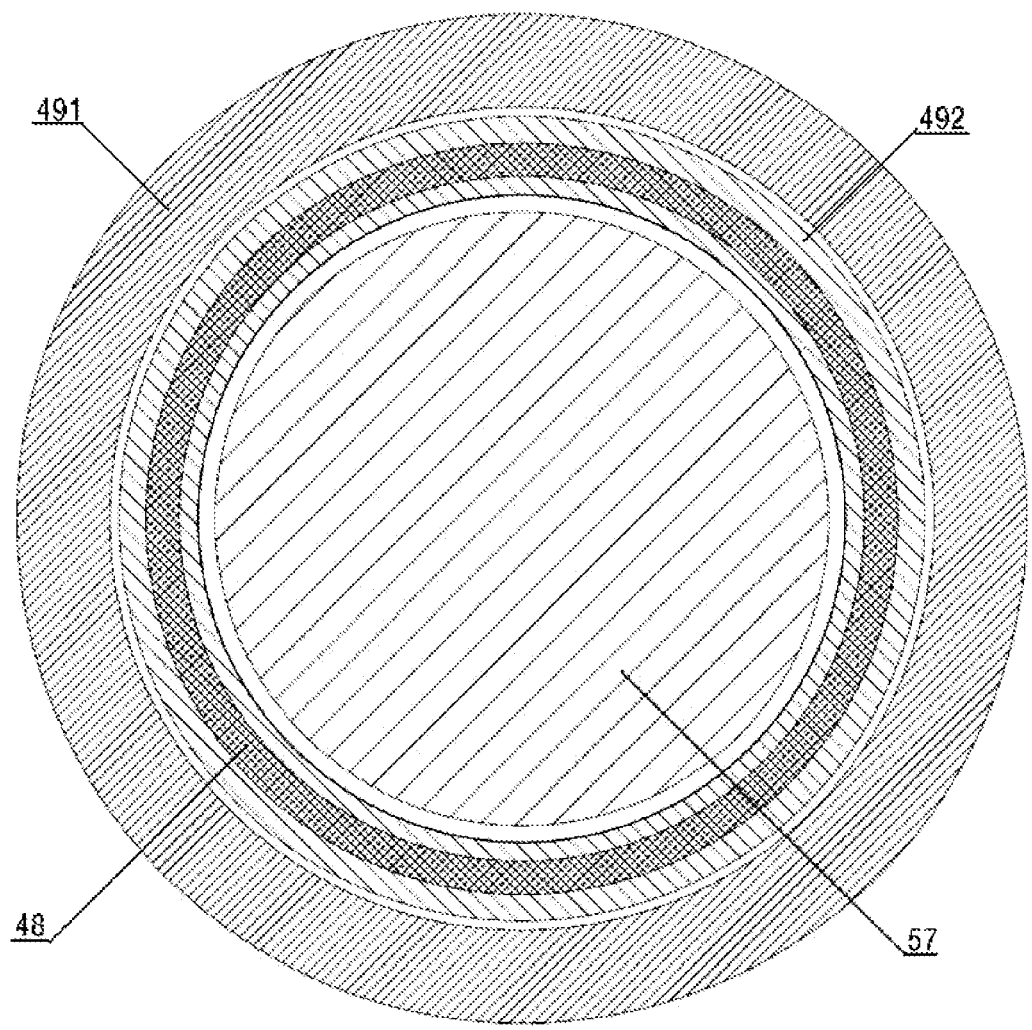
Figure 8:
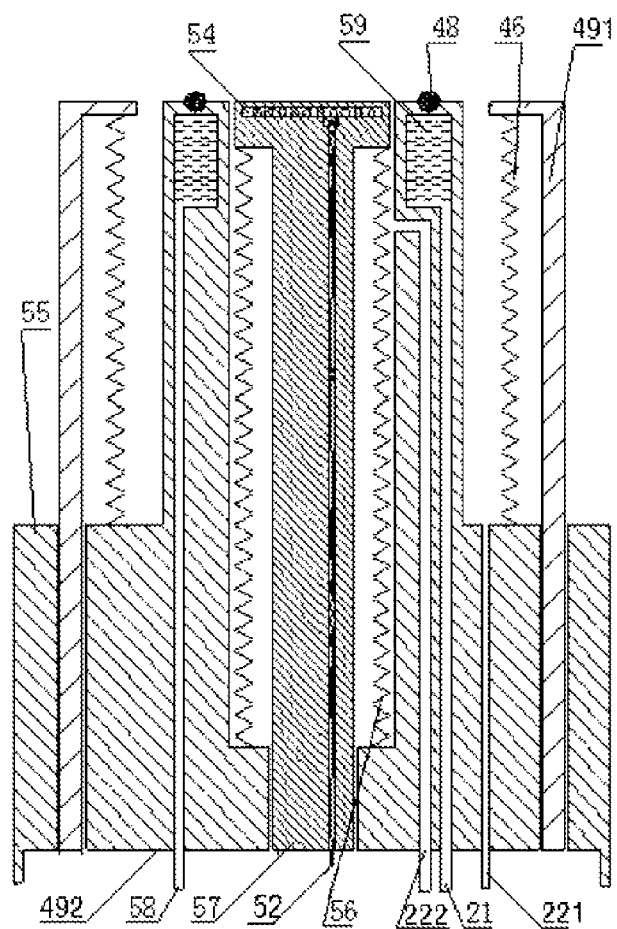
FIG. 8 illustrates a cross-sectional view of the vacuum pumping device shown in FIG. 7b, which reflects the basic structural principle of the vacuum pumping device is reflected.

FIG. 7a illustrates a schematic view of an improved structure of the vacuum pumping device shown in FIG. 2a, and FIG. 7b is the top view of the vacuum pumping device shown in FIG. 7a. FIG. 8 illustrates a cross-sectional view of the vacuum pumping device shown in FIG. 7b, and reflects the basic structural principle of the vacuum pumping device.

Compared with the vacuum pumping device shown in FIG. 2a, the main difference of the vacuum pumping device shown in FIGS. 7a, 7b and 8 is that the pumping operation unit 49 of FIG. 7a includes a pre-pumping/pre-pressing operation unit 491 and a vacuum pumping operation unit 492. Herein, the pre-pumping/pre-pressing operation unit 491 and the vacuum pumping operation unit 492, which form a circular tube with the former being outside and the latter being inside, share the same central axis Z as the pump-out hole sealing operation unit 57, and pumping channels 221 and 222 for respectively performing pre-pumping/pre-pressing operation and vacuum pumping operation are formed in respective tube walls of the pre-pumping/pre-pressing operation unit 491 and the vacuum pumping operation unit 492, respectively. In such case, the elastic heat-resisting seal ring 48, which is configured to provide airtight effect and to achieve elastic contact with the surface of the vacuum glazing being processed, may be placed on the top end of the vacuum pumping operation unit 492. Accordingly, the seal ring 48 contacts with the vacuum glazing being processed only when performing vacuum pumping operation, thereby prolonging the lifetime of the seal ring 48.

The advantages of dividing the pumping operation unit 49 shown in FIG. 2a into the pre-pumping/pre-pressing operation unit 491 and the vacuum pumping operation unit 492 will be described, by referring to the curve graph shown in FIG. 4.

As shown in FIG. 4, the temperature of pre-pumping/pre-pressing operation (that is, the section P1 of FIG. 4) is relatively high, and in this embodiment, under the condition of the temperature ranging from 400° C. to 450° C. the pumping lasts approximately 15 minutes, so as to cause the glass solder 1 for edge sealing to be fused appropriately (in paste form). The pre-pumping/pre-pressing operation is controlled so as to generate an pressure difference of approximately one atmospheric pressure between the cavity layer 2 of the vacuum glazing and the outside, this pressure difference can even out the glass solder 1 that has been appropriately fused, and cause the height of the glass solder 1, after being solidified, to be the same as the height h of the pillars 3 of the vacuum glazing, thereby preventing from forming a destructive tensile stress at the edge portions of the vacuum glazing, so as to ensure the quality of the product and prolong its lifetime.

Different from the pre-pumping/pre-pressing operation, the vacuum pumping operation is the last operation before the pump-out hole sealing operation. When performing the vacuum pumping operation, the environmental temperature is much lower than that that of performing pre-pumping/pre-pressing operation. For example, when performing the vacuum pumping operation, the temperature ranges from 200° C. to 250° C. and pumping lasts approximately 10 minutes (that is, the section P2 of FIG. 4). In addition, as the edge sealing operation has been completed for the vacuum glazing being processed at this time, and a high-vacuum status needs to be achieved in the cavity layer of the vacuum glazing, the seal ring 48 needs to be used to achieve a highly airtight status. The challenge is how to make the seal ring 48 maintain good sealing property. Although a number of heat-resisting sealing rubber materials constantly emerge, a sealing rubber material that can maintain good sealing performance for a long time under the conditions of high temperature above 450° C. has not existed for now.

In view of the above situation, the pumping operation unit 49 of FIG. 2a is divided into the pre-pumping/pre-pressing operation unit 491 and the vacuum pumping operation unit 492, according to the embodiment of the present invention shown in FIGS. 7a, 7b and 8. Structurally, the pre-pumping/pre-pressing operation unit 491 and the vacuum pumping operation unit 492 have the same central axis Z with the pump-out hole sealing operation unit 57, and form a circular tube with the pre-pumping/pre-pressing operation unit 491 being outside and the vacuum pumping operation unit 492 being inside, and pumping channels 221 and 222 for respectively performing the pre-pumping/pre-pressing operation and the vacuum pumping operation are formed in respective tube walls of the pre-pumping/pre-pressing operation unit 491 and the vacuum pumping operation unit 492. In such case, an elastic heat-resisting seal ring 48, which is configured to provide airtight effect and to achieve elastic contact with the surface of the vacuum glazing being processed, may be placed on the top end of the vacuum pumping operation unit 492. Accordingly, the seal ring 48 contacts with the vacuum glazing being processed that has a relatively lower temperature only when performing the vacuum pumping operation, thereby prolonging the lifetime of the seal ring 48.

Compared with the vacuum pumping device shown in FIG. 2a, the pre-pumping/pre-pressing operation unit 491 and the vacuum pumping operation unit 492 of the vacuum pumping device shown in FIGS. 7a, 7b and 8 perform different operations under different temperatures and different requirements on durations of pumping, respectively. This facilitates selecting suitable materials to make different operation units 491 and 491, and prevents the elastic heat-resisting seal ring 48 from exposing to a high temperature (for example, 450° C. or above) environment for a long time, thereby ensuring the reliability of the entire vacuum glazing manufacturing system.

In addition, in order to further decrease the operating temperature of the vacuum pumping operation unit 492, to increase the reliability and lifetime of the elastic heat-resisting seal ring 48 a cavity 59 for containing cooling liquid such as water, a inletpipe 21 for delivering cooling liquid and an outletpipe 58 may be formed in the tube wall of the vacuum pumping operation unit 492 to form a cooling system, as shown in FIG. 8.

The cooling system (21, 58, 59) may also be provided in the pumping operation unit 49 of the embodiment shown in FIGS. 2a and 2b. The way of providing the cooling system is similar with that shown in FIG. 8, that is, a cavity which can accommodate circular cooling liquid is provided at the top portion of the pumping operation unit 49. However, a case where the environmental temperature is up to 450° C. when the pumping operation unit 49 is performing the pre-pumping/pre-pressing operation should be considered. To ensure good working performance of the elastic heat-resisting seal ring 48, a material with higher temperature resistance should be used to make the elastic heat-resisting seal ring 48 on one hand, and on the other hand, a cooling system with higher efficiency should be introduced, for example, liquid nitrogen or liquid ammonia may be used as the cooling liquid in the cooling system.

Referring to FIG. 7a again, compared with the vacuum pumping device shown in FIG. 2a, the pumping operation unit 49 shown in FIG. 2a is divided into the pre-pumping/pre-pressing operation unit 491 and the vacuum pumping operation unit 492. As shown in FIG. 7a, the driving device 100 may include: a lift driving device 101 for driving the pre-pumping/pre-pressing operation unit 491, the vacuum pumping operation unit 492 and the pump-out hole sealing operation unit 57 to move relatively along the central axis Z; a pre-pressing/vacuum pumping driving device 102 for controlling the pumping channel 221 of the pre-pumping/pre-pressing operation unit 491 and the pumping channel 222 of the vacuum pumping operation unit 492 to perform pre-pumping/pre-pressing operation and vacuum pumping operation, respectively; a heating driving device 103 for controlling the heating unit 54 to heat the sealing sheet 53; and a cooling driving device 104 for driving the cooling liquid to flow circularly in the cooling system (21, 58, 59).

Operationally, the vacuum pumping device shown in FIG. 7a is substantially the same as that shown in FIG. 2a except that in the vacuum pumping device shown in FIG. 7a, the pre-pumping/pre-pressing operation and the vacuum pumping operation are performed by the pre-pumping/pre-pressing operation unit 491 and the vacuum pumping operation unit 492, respectively.

FIG. 8 illustrates a cross-sectional view of the vacuum pumping device shown in FIG. 7b, which reflects the basic structural principle of the vacuum pumping device. As shown in FIG. 8, in addition to the above described units, reference numeral 46 represents a pre-pressing corrugated pipe and reference numeral 56 represents a pump-out hole sealing corrugated pipe. These corrugated pipes are used to achieve and/or improve elastic contact between the pre-pumping/pre-pressing operation unit 491 and the vacuum pumping operation unit 492 and the surface of the vacuum glazing being processed. The vacuum pumping device shown in FIG. 8 further includes an outer tube wall 55 for connecting the vacuum pumping device according to the present invention with the vacuum glazing manufacturing system.

FIG. 9 is a schematic view illustrating that the vacuum pumping device shown in FIG. 8 is mounted in a vacuum glazing manufacturing system/production line.

Referring to FIG. 9, it may be assumed that the vacuum glazing being processed is located in one of the processing furnace shown in FIG. 3, such as the pre-pressure furnace, the vacuum furnace or the edge sealing furnace. Units represented by the reference numerals shown in FIG. 9 can refer to the below table 1. It should be particularly noted that, as shown in FIG. 9, a radiation baffle 37 is mounted on the top end of the vacuum pumping device according to the present invention. When the temperature outside is overhigh, the radiation baffle 37 is closed to prevent the vacuum pumping device from being destroyed by high temperature radiation, and especially to prevent the seal ring 48 from aging rapidly or being damaged, thereby prolonging its lifetime.

The vacuum pumping device according to the present invention can enable the pre-pumping/pre-pressing operation, the vacuum pumping operation and the pump-out hole sealing operation in the continuous automatic production line of vacuum glazing to be completed in integration. This makes the operation steps not only continuous and reliable, but also easy to be coordinated and operated, thereby increasing stability. According to the technical solution of the present invention, vacuum glazing productions with higher precision can be produced, meanwhile consumptions of energy sources and time may be decreased, and real continuous production can be achieved.

Although various embodiments of the present invention have been described with reference to the accompanying drawings, however, these embodiments are only used as illustrative examples. Those skilled in the art should understand that various modifications and variations may be made without departing from the spirit of the present invention. Accordingly, the scope of the present invention should be defined by the appended claims.

TABLE 1

| reference numerals in FIG. 9 | |
|---|---|
| 4 | Lower glass sheet |
| 7 | Clip |
| 17 | Wheels of glass cart |
| 18 | X-directional driving motor of vacuum pumping device |
| 19 | Outer lead wire of heating unit |
| 20 | Pipeline for prepressing vacuum |
| 21 | Cooling liquid inletpipe |
| 22 | pumping channel |
| 23 | Lifting cylinder forsealing sheet |
| 24 | Lifting cylinder forseal ring |
| 25 | Sliderfor vacuum pumping device |
| 26 | Lifting cylinder for pre-pumping/pre-pressing operation unit |
| 27 | Guide rail for vacuum pumping device |
| 28 | Y-directional driving motor of Vacuum pumping device |
| 29 | Cooling liquid pump |
| 30 | Molecular pump |
| 31 | Gate valve |
| 32 | Forestage vacuum valve |
| 33 | Pre-pumping/pre-pressing vaccum valve |
| 34 | Vacuum pump |
| 35 | Cart frame |
| 36 | Electric cabinet |
| 37 | Radiation baffle |
| 38 | Outer wall of furnace |
| 39 | Insulating layer |
| 40 | Encapsulated getter |
| 41 | Pump-out hole |
| 42 | Inner wall of furnace |
| 43 | Furnce heater |
| 44 | Inner radiation baffle |
| 53 | Sealing sheet |
| 55 | Outer wall |
| 60 | Vertical positioning unit |
| 60-1 | Hinge of vertical positioning unit |
| 60-2 | upper plate of vertical positioning unit |
| 60-3 | Spring of positioning unitt |
| 60-4 | Guide pillar of vertical positioning unit |
| 60-5 | Lower positioning plate of vertical positioning unit |
| 61 | Heating convection fan |
| 63 | Driving shaft of transverse positioning sensor |
| 64 | Transverse positioning optical sensor |
| 65 | Driving motor of transverse positioning sensor |
| 66 | Universal ball pillars |
| 67 | Temperature sensor |
| 68 | Rack |

The invention claimed is:

1. A vacuum pumping device for manufacturing a vacuum glazing, comprising:
   a circular tubular pumping operation unit;
   a cylindrical pump-out hole sealing operation unit;
   a control part; and
   a driving device,
   wherein the pumping operation unit and the pump-out hole sealing operation unit share a same central axis, form a cylinder with the operation unit being outside and the pump-out hole sealing operation unit being inside, and are able to move relatively along the central axis, wherein a pumping channel is formed in a tube wall of the pumping operation unit to be connected to an inner surface of the tube wall, and a heating unit is provided in a top portion inside the pump-out hole sealing operation unit, and wherein the control part, through the driving device, time-sequentially controls the pumping operation unit and the pump-out hole sealing operation unit to move relatively along the central axis, controls the pumping channel to perform a pre-pumping/pre-pressing operation and a vacuum pumping operation, and controls the heating unit to heat a sealing sheet to perform a pump-out hole sealing operation, wherein the vacuum pumping device further comprises:

an elastic heat-resisting seal ring provided on a top of the pumping operation unit, and a cooling system formed in the tube wall of the pumping operation unit.

2. The vacuum pumping device of claim 1, wherein the driving device comprises:

a lift driving device for driving the pumping operation unit and the pump-out hole sealing operation unit to move relatively along the central axis;

a pre-pressing/vacuum pumping driving device for controlling the pumping channel of the pumping operation unit to perform the pre-pumping/pre-pressing operation and the vacuum pumping operation;

a heating driving device for controlling the heating unit to heat the sealing sheet; and a cooling driving device for driving cooling liquid to flow circularly in the cooling system.

3. The vacuum pumping device of claim 1, wherein the pumping operation unit includes a pre-pumping/pre-pressing operation unit and a vacuum pumping operation unit, wherein the pre-pumping/pre-pressing operation unit and the vacuum pumping operation unit have the same central axis as the pump-out hole sealing operation unit, and form a circular tube with the pre-pumping/pre-pressing operation unit being outside and the vacuum pumping operation unit being inside, and wherein pumping channels for respectively performing the pre-pumping/pre-pressing and the vacuum pumping operation are formed in the respective tube walls of the pre-pumping/pre-pressing operation unit and the vacuum pumping operation unit.

4. The vacuum pumping device of claim 3, wherein the driving device comprises:

a lift driving device for driving the pre-pumping/pre-pressing operation unit, the vacuum pumping operation unit and the pump-out hole sealing operation unit to move relatively along the central axis;

a pre-pressing/vacuum pumping driving device for controlling the pumping channel of the pre-pumping/pre-pressing operation unit and the pumping channel of the vacuum pumping operation unit to perform the pre-pumping/pre-pressing operation and the vacuum pumping operation, respectively;

a heating driving device for controlling the heating unit to heat the sealing sheet; and a cooling driving device for driving cooling liquid to flow circularly in the cooling system.

5. A method of performing a pre-pumping/pre-pressing operation, a vacuum pumping operation and a pump-out hole sealing operation in manufacturing a vacuum glazing by using the vacuum pumping device according to claim 1, the method including the steps of:

when performing the pre-pumping/pre-pressing operation and the vacuum pumping operation:

moving the pumping operation unit along the central axis such that the pumping operation unit is positioned on a lower surface of the vacuum glazing being processed and is aligned with the centre of a pump-out hole, thereby causing a cavity formed by relative movement of the pumping operation unit and the pump-out hole sealing operation unit to be connected to a cavity layer of the vacuum glazing being processed via the pump-out hole, and the pumping channel of the pumping operation unit to be connected to the cavity;

performing the pre-pumping/pre-pressing operation and the vacuum pumping operation through the pumping channel of the pumping operation unit and when performing the pump-out hole sealing operation:

moving the pump-out hole sealing unit along the central axis such that a sealing sheet with a sealing solder is placed on the pump-out hole; and controlling the heating unit to heat the sealing sheet so as to fuse the sealing solder, thereby sealing the pump-out hole.

6. The method of claim 5, wherein the driving device comprises:

a lift driving device for driving the pumping operation unit and the pump-out hole sealing operation unit to move relatively along the central axis;

a pre-pressing/vacuum pumping driving device for controlling the pumping channel of the pumping operation unit to perform the pre-pumping/pre-pressing operation and the vacuum pumping operation;

a heating driving device for controlling the heating unit to heat the sealing sheet; and a cooling driving device for driving cooling liquid to flow circularly in the cooling system.

7. A method of performing a pre-pumping/pre-pressing operation, a vacuum pumping operation and a pump-out hole sealing operation in manufacturing a vacuum glazing by using the vacuum pumping device according to claim 3, the method including the steps of:

when performing the pre-pumping/pre-pressing operation:

moving the pre-pumping/pre-pressing operation unit along the central axis such that the pre-pumping/pre-pressing operation unit is positioned on a lower surface of the vacuum glazing being processed and is aligned with the centre of a pump-out hole, thereby causing a cavity formed by relative movement of the pre-pumping/pre-pressing operation unit and the pump-out hole sealing operation unit to be connected to a cavity layer of the vacuum glazing being processed via the pump-out hole, and the pumping channel of the pre-pumping/pre-pressing operation unit to be connected to the cavity; and performing the pre-pumping/pre-pressing operation through the pumping channel of the pre-pumping/pre-pressing operation unit, and when performing the vacuum pumping operation:

moving the vacuum pumping operation unit along the central axis such that the vacuum pumping operation unit is positioned on the lower surface of the vacuum glazing being processed and is aligned with the centre of the pump-out hole, thereby causing a cavity formed by relative movement of the vacuum pumping operation unit and the pump-out hole sealing operation unit to be connected to the cavity layer of the vacuum glazing being processed via the pump-out hole, and the pumping channel of the vacuum pumping operation unit to be connected to the cavity; and performing the vacuum pumping operation through the pumping channel of the vacuum pumping operation unit, and when performing the pump-out hole sealing operation:

moving the pump-out hole sealing unit along the central axis such that a sealing sheet with a sealing solder is placed on the pump-out hole; and controlling the heating unit to heat the sealing sheet so as to fuse the sealing solder, thereby sealing the pump-out hole.

8. The method of claim 7, wherein the driving device comprises:

a lift driving device for driving the pre-pumping/pre-pressing operation unit, the vacuum pumping operation unit and the pump-out hole sealing operation unit to move relatively along the central axis;

a pre-pressing/vacuum pumping driving device for controlling the pumping channel of the pre-pumping/pre-pressing operation unit and the pumping channel of the vacuum pumping operation unit to perform the pre-pumping/pre-pressing operation and the vacuum pumping operation, respectively;

a heating driving device for controlling the heating unit to heat the sealing sheet; and a cooling driving device for driving cooling liquid to flow circularly in the cooling system.

* * * * *